United States Patent
Laik

(10) Patent No.: US 11,488,264 B2
(45) Date of Patent: Nov. 1, 2022

(54) INTERACTION RECOMMENDATION ENGINE

(71) Applicant: Philippe Charles Laik, Monte Carlo (MC)

(72) Inventor: Philippe Charles Laik, Monte Carlo (MC)

(*) Notice: Subject to any disclaimer, the term of this patent is extended or adjusted under 35 U.S.C. 154(b) by 0 days.

(21) Appl. No.: 16/086,281

(22) PCT Filed: Sep. 14, 2018

(86) PCT No.: PCT/IB2018/057066
§ 371 (c)(1),
(2) Date: Sep. 18, 2018

(87) PCT Pub. No.: WO2020/053631
PCT Pub. Date: Mar. 19, 2020

(65) Prior Publication Data
US 2021/0233182 A1 Jul. 29, 2021

(51) Int. Cl.
*H04L 29/08* (2006.01)
*G06Q 50/00* (2012.01)
*G06F 16/957* (2019.01)

(52) U.S. Cl.
CPC ........... *G06Q 50/01* (2013.01); *G06F 16/957* (2019.01)

(58) Field of Classification Search
CPC .............................. G06Q 50/01; G06F 16/957
See application file for complete search history.

(56) References Cited

U.S. PATENT DOCUMENTS

| | | | |
|---|---|---|---|
| 6,980,870 B1 | 12/2005 | Mok et al. | |
| 8,825,658 B1* | 9/2014 | Suvar | G06F 16/9535 707/738 |
| 9,037,578 B2 | 5/2015 | Brust et al. | |
| 9,177,291 B2* | 11/2015 | Martinazzi | G06Q 30/0201 |
| 9,704,202 B1* | 7/2017 | Delker | G06Q 30/0631 |
| 9,947,036 B2* | 4/2018 | Zamer | G06Q 30/0633 |
| 10,191,937 B2* | 1/2019 | Sohn | G06Q 10/10 |
| 10,275,404 B2* | 4/2019 | Harbick | G06F 16/24578 |
| 10,666,921 B2* | 5/2020 | Christensen | H04N 13/117 |
| 11,010,436 B1* | 5/2021 | Peng | G06F 16/3322 |
| 2008/0086318 A1* | 4/2008 | Gilley | G06Q 10/06 705/319 |
| 2009/0106040 A1* | 4/2009 | Jones | G06Q 30/02 705/319 |
| 2010/0082357 A1* | 4/2010 | Follmann | G06Q 10/06 705/1.1 |

(Continued)

FOREIGN PATENT DOCUMENTS

| | | |
|---|---|---|
| WO | 20140059347 A | 4/2014 |
| WO | 2014193424 A | 12/2014 |

OTHER PUBLICATIONS

PCT/IB2018/057066 Written Opinion.

*Primary Examiner* — Hassan Mrabi
(74) *Attorney, Agent, or Firm* — Foundation Law Group LLP; J D Harriman

(57) ABSTRACT

The system provides a method and apparatus for generating a profile of a first user, where the profile comprises interaction parameters associated with the user. The system can generate a profile of a second user, also comprising interaction parameters of the second user. The system can then provide suggestions to either or both the first and second user for interacting with each other.

15 Claims, 8 Drawing Sheets

(56) References Cited

U.S. PATENT DOCUMENTS

| | | | | |
|---|---|---|---|---|
| 2011/0107232 A1* | 5/2011 | Brody | G06Q 30/00 | 715/745 |
| 2012/0054666 A1* | 3/2012 | Baird-Smith | G06Q 50/01 | 715/780 |
| 2012/0246302 A1* | 9/2012 | Lafleur | G06Q 30/02 | 709/224 |
| 2012/0266258 A1* | 10/2012 | Tuchman | H04L 67/16 | 726/28 |
| 2013/0191372 A1* | 7/2013 | Lee | G06F 16/9535 | 707/722 |
| 2013/0311324 A1* | 11/2013 | Stoll | H04L 67/306 | 705/26.7 |
| 2014/0012918 A1* | 1/2014 | Chin | H04L 67/18 | 709/204 |
| 2014/0075385 A1* | 3/2014 | Wan | G06Q 30/0601 | 715/812 |
| 2014/0136323 A1* | 5/2014 | Zhang | G06Q 10/10 | 705/14.53 |
| 2014/0229487 A1* | 8/2014 | Mukund | G06Q 50/01 | 707/740 |
| 2014/0257890 A1* | 9/2014 | Polonsky | G06Q 30/02 | 705/7.11 |
| 2015/0032814 A1* | 1/2015 | Broustas | G06Q 30/0631 | 709/204 |
| 2015/0100570 A1* | 4/2015 | Zent | G06F 16/334 | 707/723 |
| 2015/0248721 A1* | 9/2015 | Brown | G06Q 30/0631 | 705/26.7 |
| 2015/0262219 A1* | 9/2015 | Vock | H04L 67/22 | 705/14.41 |
| 2016/0171582 A1* | 6/2016 | Linden | G06Q 50/01 | 705/26.62 |
| 2016/0171588 A1* | 6/2016 | Linden | G06F 3/04842 | 705/26.7 |
| 2016/0180403 A1* | 6/2016 | Ganesh | G06Q 30/0269 | 705/14.66 |
| 2017/0011445 A1* | 1/2017 | Reinsberg | G06Q 30/0203 | |
| 2017/0011446 A1* | 1/2017 | Reinsberg | G06Q 30/0627 | |
| 2017/0083962 A1* | 3/2017 | Agarwal | G06Q 50/01 | |
| 2017/0083963 A1* | 3/2017 | Agarwal | G06F 16/951 | |
| 2017/0177589 A1* | 6/2017 | Shorman | G06Q 50/01 | |
| 2018/0315116 A1* | 11/2018 | Medina | G06Q 30/0631 | |
| 2019/0005547 A1* | 1/2019 | Tan | G06F 16/435 | |
| 2019/0050774 A1* | 2/2019 | Divine | G16H 50/20 | |
| 2019/0080425 A1* | 3/2019 | Bui | G06F 16/9032 | |
| 2019/0244308 A1* | 8/2019 | Albertine | G06Q 10/1093 | |
| 2019/0364131 A1* | 11/2019 | Rogynskyy | G06Q 10/04 | |

* cited by examiner

INTERACTION RECOMMENDATION ENGINE

BACKGROUND

In any relationship, communication plays a vital role in either developing the relationship or degrading the relationship. The communication between two individuals or a group of individuals can be positive and developing if the communication involves such topics in which the individuals or the group of individuals are interested. Similarly, the communication between the individual may be non-interactive if the communication involves topics which are not of mutual interest.

SUMMARY

The system provides a method and apparatus for generating a profile of a first user, where the profile comprises interaction parameters associated with the user. The system can generate a profile of a second user, also comprising interaction parameters of the second user. The system can then provide suggestions to either or both the first and second user for interacting with each other.

BRIEF DESCRIPTION OF FIGURES

The following detailed description references the drawings, wherein.

DETAILED DESCRIPTION

Figure 1:
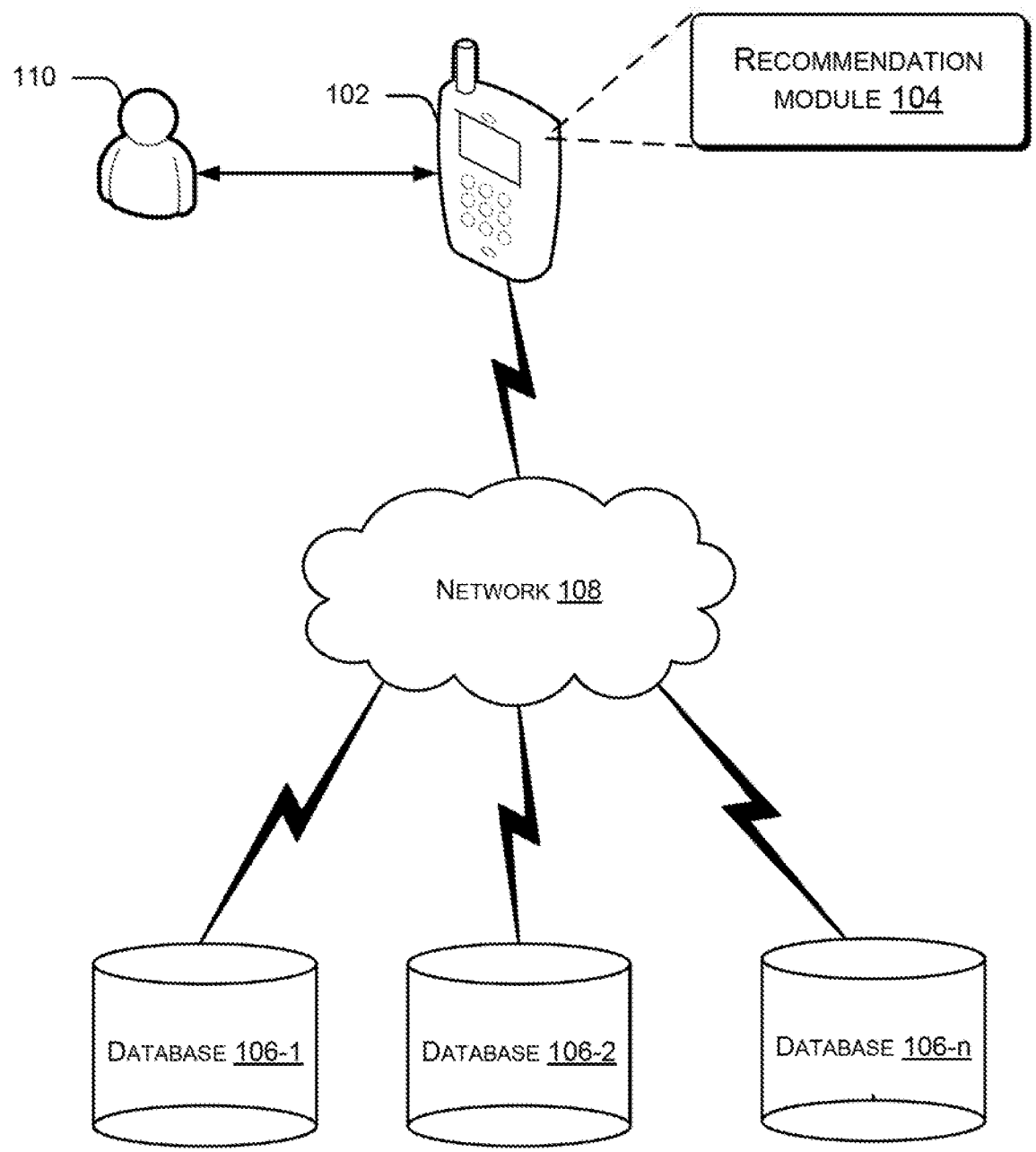
FIG. 1 illustrates a network environment implementing an interaction recommendation system, in accordance with an example implementation of the present subject matter.

The description of the present subject matter herein incorporates in its entirety the specification and drawings of the US granted patent U.S. Pat. No. 6,980,870, by reference. The U.S. Pat. No. 6,980,870 discloses techniques for managing, optimizing, and scheduling personal relationship with a contact.

A relationship between two individuals depends on the various factors, such as their interests, behavior, nature, and attitude. It is sometime difficult for a user to decide how he should interact with other user for an efficient and fruitful communication. For example, it is difficult for the individuals to decide a topic of discussion, a place of meeting, choice of food, etc. Similarly, it may be sometimes difficult for parents to efficiently communicate with their teenage children such that the communication is engaging and interactive. Therefore, various factors are to be considered during any interaction between individuals. Wrong choices of such parameters may lead to unsuccessful meetings and inefficient communication between the individuals. For example, during a first date, it may be difficult for two individuals to decide a topic of discussion or a mutual point of interest. Similarly, in situations when two individuals are meeting after a long time, it may sometimes be difficult for them to determine mutual interests. Therefore, to effectively interact with others, an individual should be aware of his own behavior, likes and dislikes, along with the behavior, likes and dislikes of others. However, it is difficult for any individual to be fully aware of his/her own behavior, along with the behavior of others. This may lead to ineffective communication between individuals and may lead to unfruitful social interactions.

According to the present subject matter, techniques for providing suggestions for interaction between individuals are provided. In an example of the present subject matter, an interaction recommendation system determines various profile parameters, along with different interaction parameters corresponding to an individual. The profile parameters may indicate the behavior, likes and dislikes of an individual, while the interaction parameters may indicate different interactional aspects associated with the individual. The profile parameters may be based on the phycology, sociology, and environmental factors of the user. In an example of the present subject matter, the interaction recommendation system, based on the determination of the profile parameters and interaction parameters, may suggest actions/recommendations to the individuals for interaction. According to the system, a digital coach implemented by the system may use various behavioral factors included in the profile parameters, such as personality type, body type, body built, favorite genre of movies, type of music, hobbies, favorite cuisine and restaurants, favorite places, environmental condition, political favorites, favorite sports etc., to suggest various interaction possibilities to an individual. Further, the digital coach may also use past interaction experience, such as events attended by the individual, status on social media platforms, frequency of meeting with other individuals, past experience of interactions, etc., to suggest various interaction possibilities to the individual.

In an example, if a meeting/date has been scheduled between two individuals, the interaction recommendation system may analyze the profile parameters of the two individuals along with the interaction parameters associated with the two individuals. The interaction recommendation system may, based on the assessment of the profile parameters and the interaction parameters, generate an interaction profile for each of the two individuals. Based on the generated interaction profile of the two individuals, the interaction recommendation system, provides suggestions, such as topic of discussion, place of meetings, etc., to both individuals.

According to the present subject matter, the detail, such as the interaction profile, the interaction parameters, all the calculations, processing, and data analysis happens at the database by backend servers. A plurality of micro software services allows parallel execution and processing of the data. The data is processed using graphical processor unit (GPU) at these databases which are significantly faster than the central processing units of the user's mobile device. Also, as the processing is done at backend servers, the battery power of the user's device is saved. In general, the mobile phone and tablet are equipped with 99% ARM processors. The backend servers are equipped with x86 processors (Intel or advanced micro devices (AMD)) and GPU (Nvidia or AMD). According to the set of benchmarks, the ARM architecture is about 8 times less efficient than the x86 architecture when it comes to complex calculation. Thus, the techniques described herein improve the operation of the processing system of the user device while providing enhanced capabilities.

The above techniques are further described with reference to FIG. 1 to FIG. 8. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 shows an interaction recommendation system 102 implementing a recommendation module 104 to provide suggestions to a user 110, according to an example implementation of the present subject matter. The interaction recommendation system 102 may be coupled with a plurality of databases, such as database 106-1, 106-2, . . . , 106-n, via a network 108.

The network 108 may be a single network or a combination of multiple networks and may use a variety of different communication protocols. The network 108 may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), and Public Switched Telephone Network (PSTN), Depending on the technology, the communication network 108 includes various network entities, such as gateways, routers; however, such details have been omitted for the sake of brevity of the present description.

The interaction recommendation system 102 may be implemented as any of a variety of conventional computing devices, including, a mobile phone, a tablet, a pager, desktop, and a laptop. Further, the databases 106-1, 106-2, . . . , 106-n may be a hierarchical database, a network database, an object-oriented database, a relational database etc.

In an example, the interaction recommendation system 102 may determine profile parameters for the user 110. The profile parameters may be likes, dislikes, personal choices, hobbies of the user 110. Further, the profile parameters may also be based on psychological, sociological, and environmental factors of the user 110. For example, the profile parameters based on psychological factors may be, introvert nature, extrovert nature etc., the profile parameters based sociological factors may be social status of the user 110 or the income level of the user 110. Further, the interaction recommendation system 102 determines interaction parameters associated with the user 110. The interaction parameters may be based on the interactional habits of the user 110, such as events in which the user may be interested in, frequency of meeting with other users etc. Based on the profile parameters and the interaction parameters, the interaction recommendation system 102 may generate interaction profile for the user 110. Further, based on the interaction profile, the recommendation module 14 of the interaction recommendation system 102 provides suggestions to the user 100 for interaction with the other user. In an example, the suggestions may be place of meeting with other users, topic of discussion, restaurant to visit etc.

According to another example implementation of the present subject matter, the user 110 of the interaction recommendation system 102 may add a second user (not shown) with which the user 110 desires to have a communication. In an example, the user 110 may add the second user from an address book stored on the user's device, a social media account of the user 110, email of the user 110 and alike.

In an example, the interaction recommendation system 102 may determine profile parameters for the second user. The profile parameters may be likes, dislikes, personal choices, hobbies of the second user. Further, the profile parameters may also be based on psychological, sociological, and environmental factors of the second user. Further, the interaction recommendation system 102 determines interaction parameters for second user. Based on the profile parameters and the interaction parameters, the interaction recommendation system 102 generates an interaction profile for the second user. Based on the interaction profile of the user 110 and the second user, the recommendation module 104 may provide suggestions to the user 110 and the second user for mutual communication.

In an example, the interaction recommendation system 102 may access the databases 106-1, 106-2, . . . , 106-n to determine the profile parameters and interaction parameters for the user 110 and the second user. For example, for determining a profile parameter, such as based on sociological parameter of contacts, the interaction recommendation system 102 may access, via the network 108, a database, say the database 106-2, to retrieve the information related to the social activities of the contact. In another example, for determining an interaction parameter, such as frequency of meeting with the other users, the interaction recommendation system 102 may access a calendar data of the user 110 to determine the frequency of meeting with other users.

The databases 106-1, 160-2, 106-3 may correspond to the databases of Facebook, Linkedin, twitter, google places etc. The interaction recommendation system 102 may access the databases of the social networking website to determine profile parameters and the interaction parameters for the user 110 and the second user. In an example, the database corresponding to the Facebook, twitter, LinkedIn, google places may be accessed through a GraphQL server. In an example, a collector may be coupled with the databases of the Facebook, twitter, LinkedIn, google places and the all the collectors may in turn be coupled with the GrpahQL server. The interaction recommendation system 102 may communicate over HyperText Transfer Protocol (HTTPS) with a graph QL server to retrieve the details from the databases of the Facebook, twitter, Linkedin, google places. In an example, the interaction recommendation system 102 may require a permission from the user to access his social account data. For example, a user, such as the user 110, may be provided a prompt 'collect my data from Facebook' and when the user allows the prompt, the user is directed to the Facebook page where the user authenticates the interaction recommendation system 102 to collected data from Facebook. The interaction recommendation system 102 sends a message to GraphQL server which may in turn initiate a collector of the Facebook to collect data from the Facebook.

The collector will collect the data and will provide the data to the GraphQL server and thereafter from the GraphQl server, the interaction recommendation system 102 may access the Facebook data. The retrieving of the data from various sources, has been explained in with reference to FIG. 3 and FIG. 4.

Based on the profile parameters and the interaction parameters, the interaction recommendation system 102 may generate an interaction profile of the user 110 and the second user. The interaction profile of the user 110 and the second user reflect the interaction parameters and the profile parameters of the user 110 and the second user. The recommendation module 104, may, thereafter provide suggestions to the user 110 based on the interactional profile of the user 110 and the second user. For example, considering that the user 110 and the second user are going for a date and the interaction profile indicates that the user 110 and the second user are both interested in football and cosmology. In this case, the recommendation module 104 may recommend to the user 110 to discuss football and cosmology during the date.

In another example, the interaction recommendation system 102 may also be used to provide suggestions to the user 110 to improve his/her relationship with his/her children. Considering an example where Michelle is a single mother who lives alone with two teenage children. Michelle wants to improve her communication with her teenage children. In such cases, the interaction recommendation system 102 would analyze the activities of the teenage children on various social media and may also analyze the details provided by Michelle about the teenage children. Based on these details and social media activity, the interaction recommendation system 102 may create an interaction profile for the teenage children and based on the interaction profile of the teenage children, may provide suggestions to Michelle to interact with her teenage children.

Figure 2:
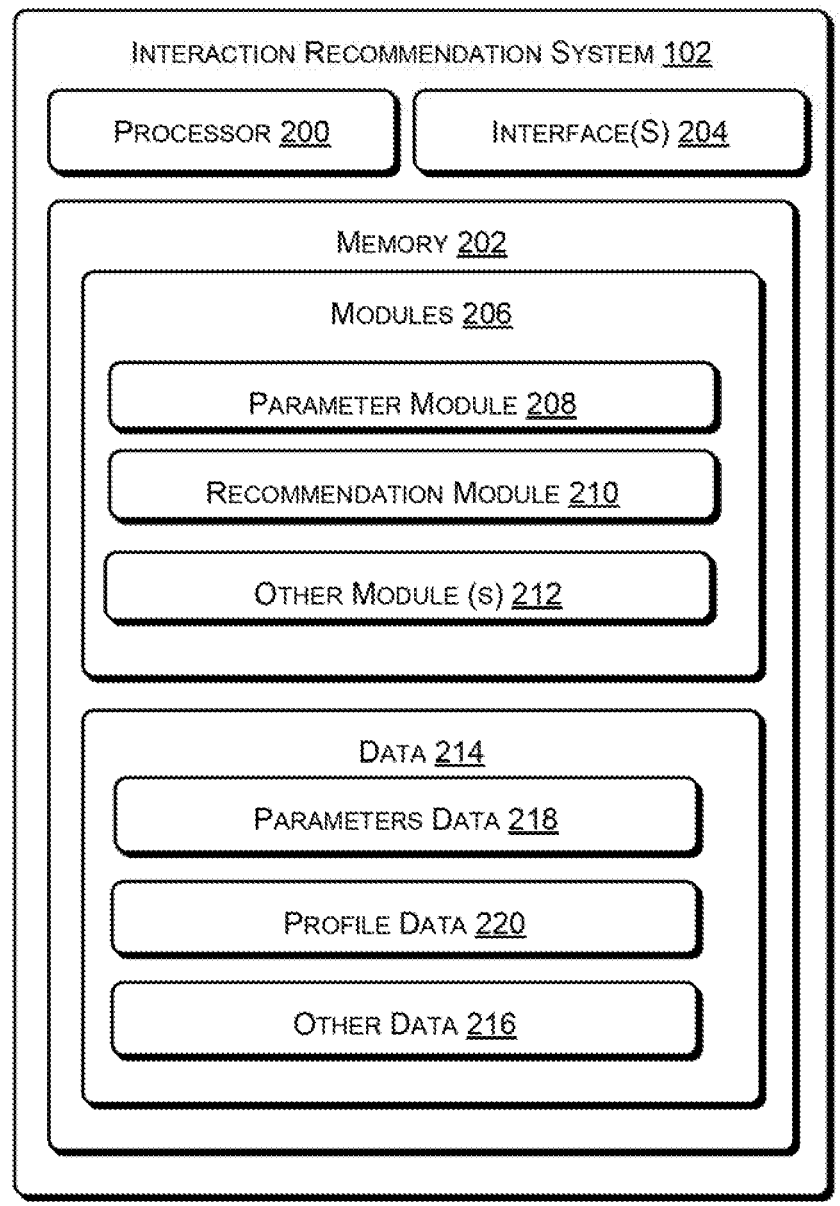
FIG. 2 illustrates an interaction recommendation system, in accordance with an example implementation of the present subject matter.

FIG. 2 illustrates the interaction recommendation system 102, in accordance with an example implementation of the present subject matter. The interaction recommendation system 102, among other things, includes processor(s) 200 and memory 202 and interface(s) 204 coupled to the processor(s) 200. The processor(s) 200 may be implemented as microprocessors, microcomputers, microcontrollers, digital signal processors, central processing units, state machines, logic circuitries, and/or any devices that manipulate signals based on operational instructions. Among other capabilities, the processor(s) 200 is configured to fetch and execute computer-readable instructions stored in the memory 202 of the interaction recommendation system 102. The memory 202 may include any computer-readable medium including, for example, volatile memory (e.g., RAM), and/or non-volatile memory (e.g., EPROM, flash memory, etc.).

The functions of the various elements shown in the Figures, including any functional blocks labelled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included. The processor(s) 200 is responsible for managing the operations of the interaction recommendation system 102.

The interface(s) 204 may include a variety of software and hardware interfaces, for example, interface for connected peripheral device(s) such as an external memory. Further, the interface(s) 204 may enable the interaction recommendation system 102 to communicate with other devices. The interface(s) 204 may facilitate multiple communications within a wide variety of protocols and networks, such as the network 108, including wired networks, e.g., LAN, cable, etc., and wireless networks, e.g., WLAN, cellular, satellite, etc. The interface 204 may be used to provide inputs to the interaction recommendation system 102. In an example, the inputs may be provided by a user.

Modules 206 and data 214 may reside in the memory 202. The modules 206 include routines, programs, objects, components, data structures, and the like, which perform particular tasks or implement particular abstract data types. In an example, the modules 206 include a parameter module 208 and a recommendation module 210, similar to the recommendation module 104. The modules 206 may also comprise other modules 212 that supplement functions of the interaction recommendation system 102.

The data 214 serves, amongst other things, as a repository for storing data that may be fetched, processed, received, or generated by the modules 206. The data 214 comprises other data 216 corresponding to the other modules 212. In the illustrated example implementation, the data 214 of the interaction recommendation system 102 also include parameters data 218 and profile data 220.

In an example, a user of the interaction recommendation system 102 may add an individual or another user with whom the user needs to communicate. In an example, the user may provide an input to the interaction recommendation system 102 to add a second user. The second user can be a family member, a friend, relative etc. The user may add the second user to the interaction recommendation system 102. In an example, the user may add the second user from the address book of his device. In another example, the user may add, other individuals, a group of individuals, a community of individuals, an association of the individuals to the interaction recommendation system 102. The term 'individuals' hereafter will include a single user, a group of users, a community of users, an association of users to which the user wises to communicate.

In an example, while adding individuals, the user may add details about the individuals, such as sex/gender of user, hobby of user, age of individuals and any other information of which the user is aware of. These details may constitute profile parameters for the user and the individuals. In an example, if the user is not aware of the details about the individuals, the user may not add any details of the individuals.

Further, in an example, the profile parameters for the user and the individuals may be determined by the interaction recommendation system 102 and may be updated against the user and the individuals. For example, the parameter module 208 of the interaction recommendation system 102 may determine a psychological parameter, sociological parameter, environmental parameter associated with the user and the individuals. In an example, the parameter module 208 may determine a parameter for the user and the individuals based on the social media activity of the user and the individuals. Thus, a plurality of profile parameters may be stored against user and the individuals. In an example, the profile parameters may be based on a personal character, an emotional state, objective of life, business objective, behaviors, attitude, professional objective, love objective of the user and the individuals. To determine the profile parameters, the parameter module 208 may access social media profiles, status, social media accounts, posts of the user and the individuals in order to determine the profile parameters of the users. In an example, the social media posts, status, events, may depict a mood, personality, and social connections of the user and the individuals. Further, the parameters module 208 may also analyze the user's database, such as image gallery of the user's device, to determine profile parameters, such as body type, personality type etc. The profile parameters may be stored in the parameters data 218.

In an example, the parameter module 208 may also monitor a history of interactions between the user and the individuals to determine interaction parameters of the user and the individuals. For example, the parameter module 208 may analyze the applications the user and the individuals use in their communication, the frequency and duration of calls. In one embodiment, the system may analyze communications and interactions and normalize the data in a particular format for semantic analysis. The system can then use a language analysis algorithm to extract a sense of the exchanges and generate profile parameters. In an example, the parameter module 208 allots a value to each of the profile parameters. For example, a set of profile parameters are shown below in table 1;

| Profile Parameters | Maximum Value | Minimum Value |
|---|---|---|
| Helpfulness | 1 | 10 |
| Objective of life | 1 | 5 |
| Extroversion/sociability | 1 | 7 |
| Independence | 1 | 6 |
| Frequency of contact | 1 | 5 |

In an example, the parameter module 208 may assign values to each of the profile parameters. For example, based on the social media activity and other physiological factors the parameters module 208 may analyze a personal character of the user and may determine that the user is helpful and may assign a value to the profile parameter helpfulness. In an example, the helpfulness may have a minimum value of 1 and a maximum value of 10. In an example, the helpfulness of the user may be determined by analyzing his day to day activities, such as receiving of donation receipts on the user's mail may employ that the user is helpful. Further, values may be assigned to each of the profile parameters.

In one embodiment, the system may note that data is lacking in certain of the parameters and metrics. The system may inject the data into a neuronal network to infer the missing information. This makes it possible to determine additional centers of interest that are not expressly indicated by the user or by the user interaction. In one embodiment, a profile such as below may be generated and updated in real time based on new interactions to various social media platforms.

| Designation | ID | Category | Minimum Value | Maximum Value |
|---|---|---|---|---|
| Importance of relation | Importance | Settings | 1 | 10 |
| Frequency of relation | Frequency | Settings | 0 | 100 |
| Curiosity: (Curious/Open or Routine/Traditional) | psyC | Psy OCEAN | 1 | 7 |
| Extroversion/Sociability: (Energetic/dynamic or reserved/quiet) | psyS | Psy OCEAN | 1 | 7 |
| Emotivity: (calm/relaxed or emotional/stressed) | psyE | Psy OCEAN | 1 | 7 |
| Preventance/Accommodation or Service: (Conciliatory/Helpful or Stubborn) | psyA | Psy OCEAN | 1 | 7 |
| Organization/Reliability: (Organized/Methodical or Impulsive/Distracted) | psyO | Psy OCEAN | 1 | 7 |
| Tradition | valT | human value | 1 | 9 |
| Universalism | valU | human value | 1 | 9 |
| Independence | valI | human value | 1 | 9 |
| Stimulation | valS | human value | 1 | 9 |
| Power | valP | human value | 1 | 9 |

The recommendation module 210 may generate an interaction profile based on the determined profile parameters and the interaction parameters associated with the user. The interaction profile may comprise details, such as behavior, attitude, goal, personality, of the user and the individuals. In an example, the recommendation module may create an interaction profile based on the values assigned to each of the profile parameters. A data relating to the interaction profile may be stored in the profile data 220. Based on the interaction profile, the recommendation module 210 provides suggestions to the user for interaction with the individuals. In an example, the suggestions may be provided by comparing the values allotted to the profile parameters of the user and the other individual. For example, for a user A if the value allotted to the helpfulness matches with the value of helpfulness allotted to a user B, the recommendation module 210 may recommend to the user to initiate a discuss on topics, such as social welfare programs, compassion etc. Further, in an example, the recommendation module 210 may suggest an activity to the user A and user B. Further, in another example, if the interaction recommendation system 102 also considers the geographical location of the users and individuals to suggest activities. In an example, the recommendation module 210 suggest a nearest place based on the location of the user and the individuals.

Considering an example, where a user, Williams, is very shy in communication. Sometimes he is not sure how to communicate with his peer group. The interaction recommendation system 102 may, based on the interaction profile of Williams, may provide push notification to know how to communicate with his peer group.

In an example, the recommendation module 210 may identify an event associated with the user and may provide suggestions for the event, for example, topic of discussion, place of event. Further, in an example, the recommendation module 210 may determine another user/individual associated with the event and may generate an interaction profile for the user. As understood, the interaction profile for the user is already generated, the recommendation module 210, based on the interaction profile of user and the interaction profile of the individual, may generate suggestions for the user and the individual. The suggestions may be a place of event, a topic of discussion of event, a special requirement for the event.

For example, if a user, Daniel, has a date with a woman, the recommendation module 210 may provide recommendation for the date. The recommendation module 210 may analyze the interaction profile of Daniel and the woman and may recommend a gift that Daniel should give to the woman. In another example, the recommendation module 210 may recommend a place of meeting for the date. The place of dating may be based on the profile parameter of the Daniel and the woman.

In an example, the recommendation module 210 may provide suggestions to the user based on the group, sex, professional goal, business goal, objective of life of the individual and the user. For example, if the user and the group of the user is having an age group of 20-25 years, the recommendation module 210 may provide suggestions for shopping, movie, trekking etc. In another example, if the age group of the user and the individuals is 50-60, the recommendation module 210 may provide suggestions indulging in a spiritual activity. In another example, if the user and the individuals have a common interest in the sport, the suggestions may be provided based on the sports.

Further, in an example, the recommendation module 210 may provide recommendation based on the historical interactions of the user. In an example, the recommendation module 210 may analyze social media status, events, or posts to determine suggestion for the user.

Figure 3:
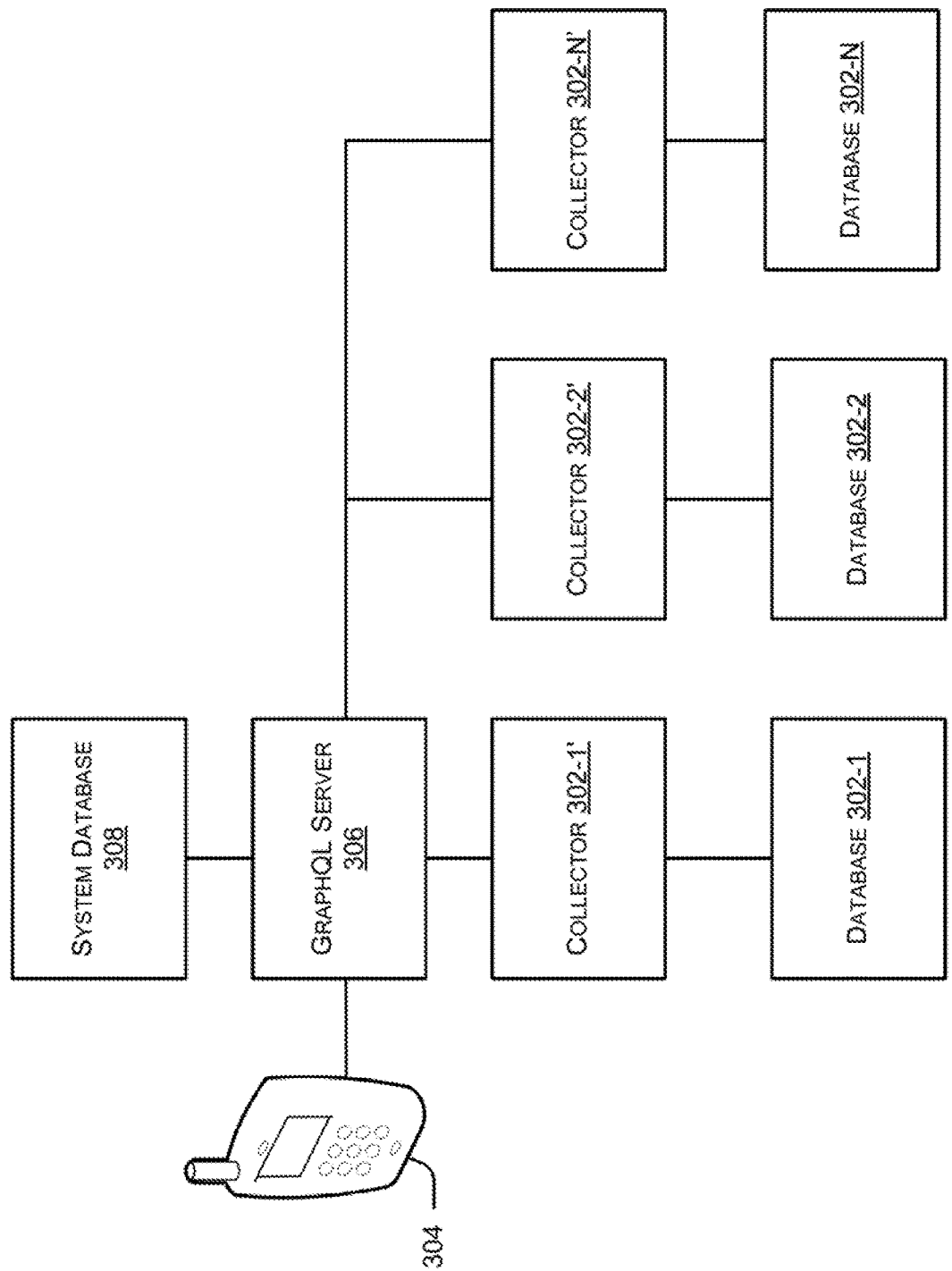
FIG. 3 illustrates an architecture for a system which retrieves data form databases, according to an example of the present subject matter.

FIG. 3 describes an architecture 300 for a system for retrieving data, such as interaction parameters from databases, such as databases of social media accounts of the user. As explained earlier, the interaction recommendation system 102 may access the databases of the social networking website to determine selection parameters. FIG. 3 shows a database 302-1, a database 302-2, ..., a database 302-N coupled to an interaction recommendation system 304 via a graphQL server 306. In an example, a collector 302-1', a collector 302-2', and a collector 302-N' may be coupled with each of the database 302-1, the database 302-2, and the database 302-N, respectively. The collector 302-1', the collector 302-2', and the collector 302-N' may be also coupled with the graphQL server 30. The interaction recommendation system 304 may communicate over HTTPS with the graphQL server 306 to retrieve the details from the database 302-1, the database 302-2, and the database 302-N. In an example, the database 302-1, the database 302-2, and the database 302-N may correspond to the databases of social media accounts of user, such as Facebook, LinkedIn, google places, twitter etc. In an example, the interaction recommendation system 304 may require a permission from a user to access his social account data. For example, a user may be provided a prompt 'collect my data from Twitter' and when the user allows the prompt, the user is directed to the Twitter page where the user authenticates the interaction recommendation system 304 to collect data from Facebook. In an example, consider that the database 302-1 corresponds to Facebook. The interaction recommendation system 304 sends a message to GraphQL server 306 which may in turn initiate the collector 302-1' of the database 302-1 to collect data from the database 302-1. In an example, the graphQL server 306 may send a message indication the data that is required. In an example, the message may comprise keywords, like 'contacts of last ten video calls', 'contacts of last ten chat conversations' etc. The collector 302-1' will collect the data and will provide the data to the GraphQL server 306 and the graphQL server 306 may store the data in a system database 308. Similarly, data from all the other databases are collected and stored in the system database 308. The graphQL server 306 may provide the required data, such as interaction parameters to the interaction recommendation system 304, when required. In an example, the database 302-1, 302-3, ..., 302-N may be implemented on mongoDB and the graphQL server may utilize mongoDb protocol for communication with the collector 302-1', 302-2', ..., 302-N'. In an example, apache spark may be employed to manage clusters of computing systems and clusters of databases.

In an example, the data in the system database 308 may be stored in an encrypted form. The encryption of the data may be done using NTRU algorithm. Due to strong protection mechanism, such as NTRU algorithm, it is very difficult for a malicious user to access sensitive personal data. Thus, changes of privacy breach are very minimal in the current system as compared to the conventional system.

Figure 4:
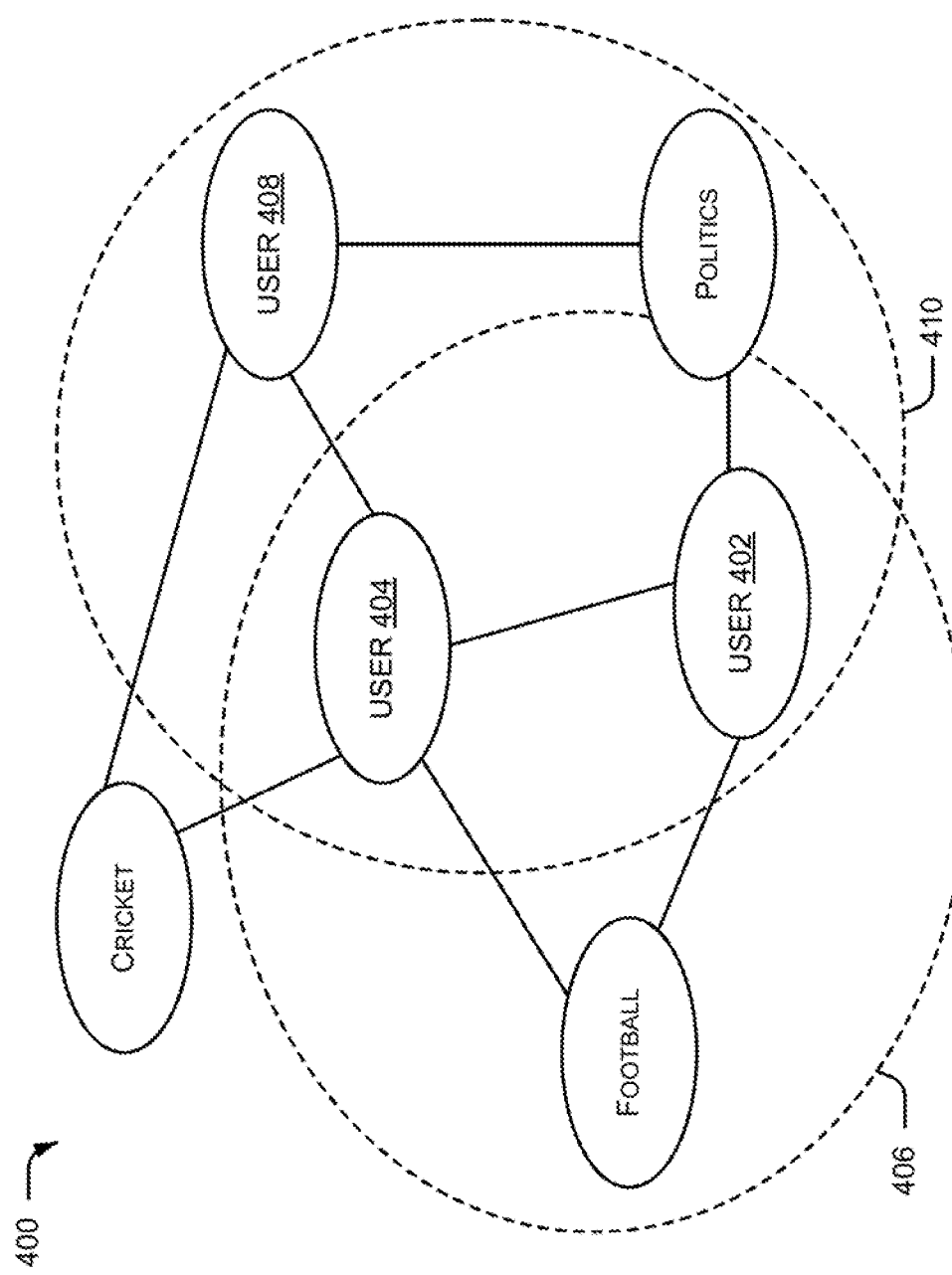
FIG. 4 shows a graph form of a stored data according to an example of the present subject matter.

Further, in an example, the data may be stored in the system database 308 in a graph form 400 as shown in FIG. 4. In an example, in the graph form 400 a data of a user 402 is linked with each other for better analysis and utilization of the data. For example, if the user 402 it is determined that the user is interested in football and further it is determined that another user 404, which is a contact in the address book of the user, is also interested in football, a connection 406 is created for the user 402. In another example, a user 408 knows the user 404 but do not knows the user 402, an indirect connection 410 is created between the user 402 and the user 408. In an example, an interest, likes, dislikes, preferences, of the user 402, the user 404, and the user 408 is also reflected on the graph form 400. For example, the user 404 and the user 408 has a common interest, i.e., cricket. In another example, the user 402, the user 404, and the user 408 has a common interest politics.

Figure 5:
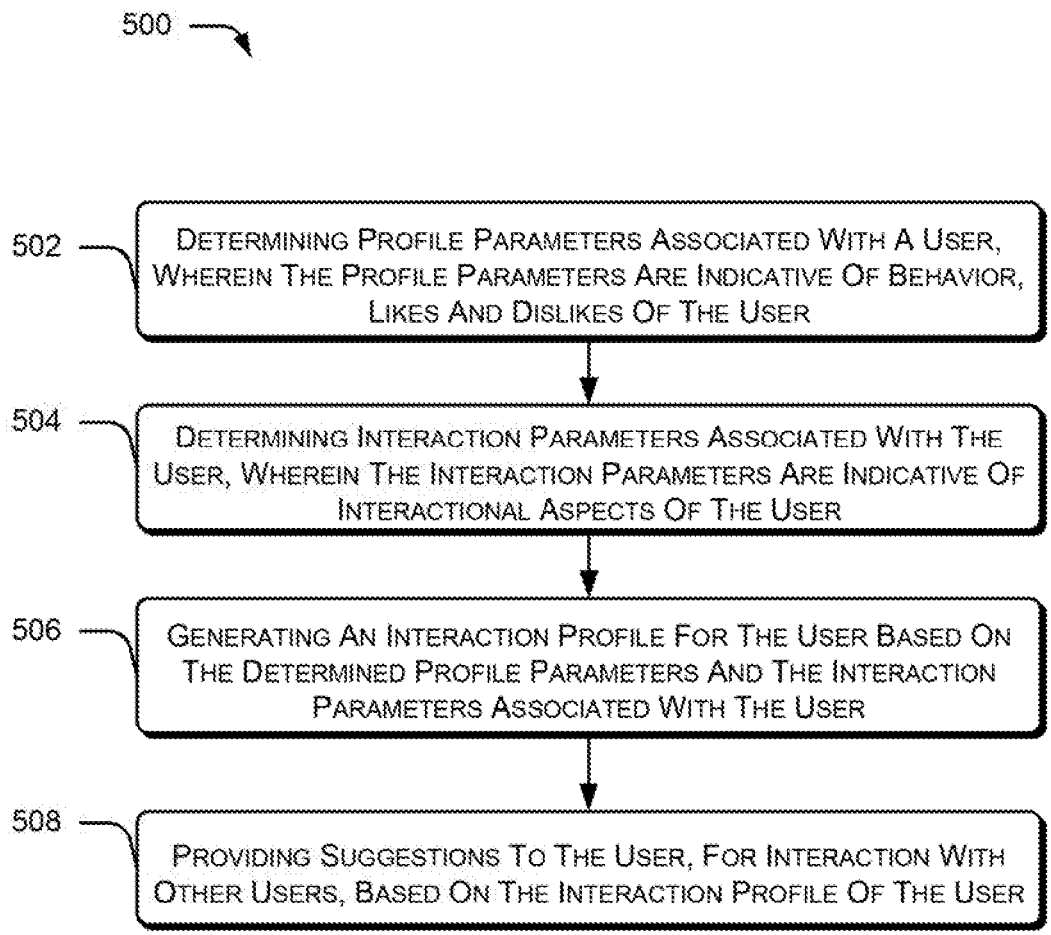
FIG. 5 illustrates a method 500 for providing suggestions for an interaction, according to an example of the present subject matter.

FIG. 5 illustrates a method 500 for providing suggestions for an interaction, in accordance with an example of the present subject matter. Although the method 500 may be implemented in a variety of interaction recommendation systems, for the ease of explanation, the present description of the example method 500 to provide suggestions is provided in reference to the above-described interaction recommendation system 102.

The order in which the method 500 is described is not intended to be construed as a limitation, and any number of the described method blocks may be combined in any order to implement the method 500, or an alternative method.

At block 502, profile parameters associated with a user is determined. The profile parameters are indicative of behavior, likes and dislikes of the user. For example, the profile parameters may include details, such as favorite sports, favorite food, favorite restaurant etc., of the user At block 504, interaction parameters associated with the user is determined. The interaction parameters are indicative of interactional aspects of the user. In an example, the interaction parameters may indicate which application a user used for communication.

At block 506, interaction profile for the user is determined based on the determined profile parameters and the interaction parameters associated with the user. Finally, at block 508, suggestions to the user are provided based on the interaction profile of the user. The suggestions are provided for interaction with the other users. For example, the suggestions may recommend a topic of discussion, a place of meeting, a food to have with the other users.

Figure 6:
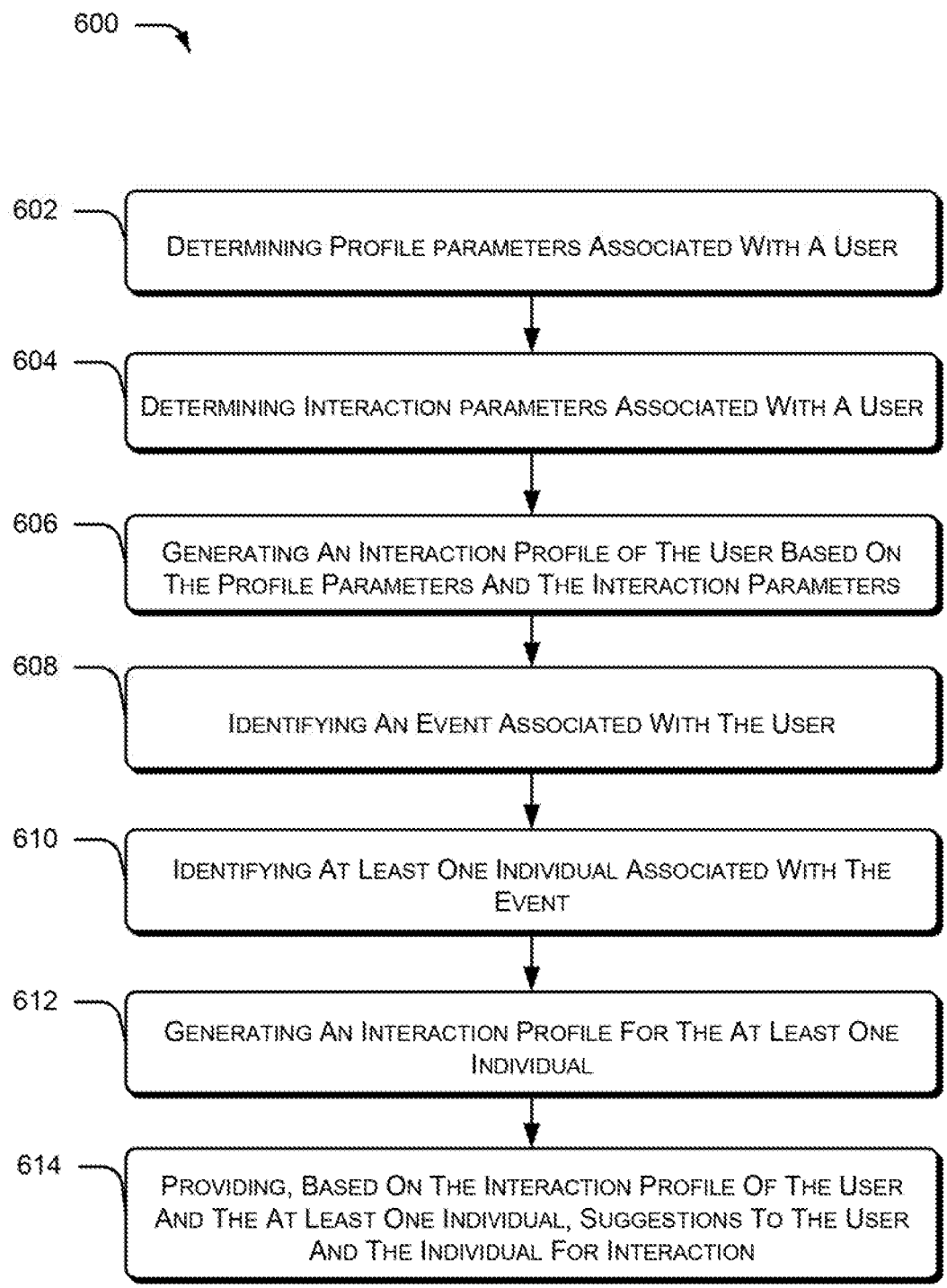
FIG. 6 illustrates another method 60) for providing suggestions for an interaction, in accordance with an example of the present subject matter.

FIG. 6 illustrates another method 600 for providing suggestions for an interaction, in accordance with an example of the present subject matter. The method 600 may be implemented in a variety of interaction recommendation systems, but for the ease of explanation, the present description of the example method 600 to provide suggestions is provided in reference to the above-described interaction recommendation system 102.

The order in which the method 600 is described is not intended to be construed as a limitation, and any number of the described method blocks may be combined in any order to implement the method 600, or an alternative method.

The method starts at block 602. At block 602, profile parameters associated with a user are determined. The profile parameters are indicative of behavior, likes, dislikes, attitude, personality, phycology, and behavior of the user. For example, if a user is an introvert, the profile parameter may be 'introvert'.

At block 604, interaction parameters associated with the user is determined. As described previously, interaction parameter depends on the interactional habit of the users and the historical interaction of the uses, in an example, the interaction parameter may be determined by accessing social media account of the user.

At block 606 an interaction profile of the user is generated based on the profile parameters and the interaction parameters and the method proceed to block 608. At block 608, an event associated with the user is identified. In an example, the event may be a date, a business meeting, a professional meeting. In an example, the event may be identified by accessing a calendar of the user's device.

At block 610, at least one individual associated with the event is identified. In an example, the at least one individual may be a woman if the event is date, a partner, if the meeting is a business meeting.

At block 612, an interaction profile of the at least one individual is generated. In an example, the interaction profile may be generated in the same manner as of the interaction profile of the user is generated in block 304-308.

Figure 7:
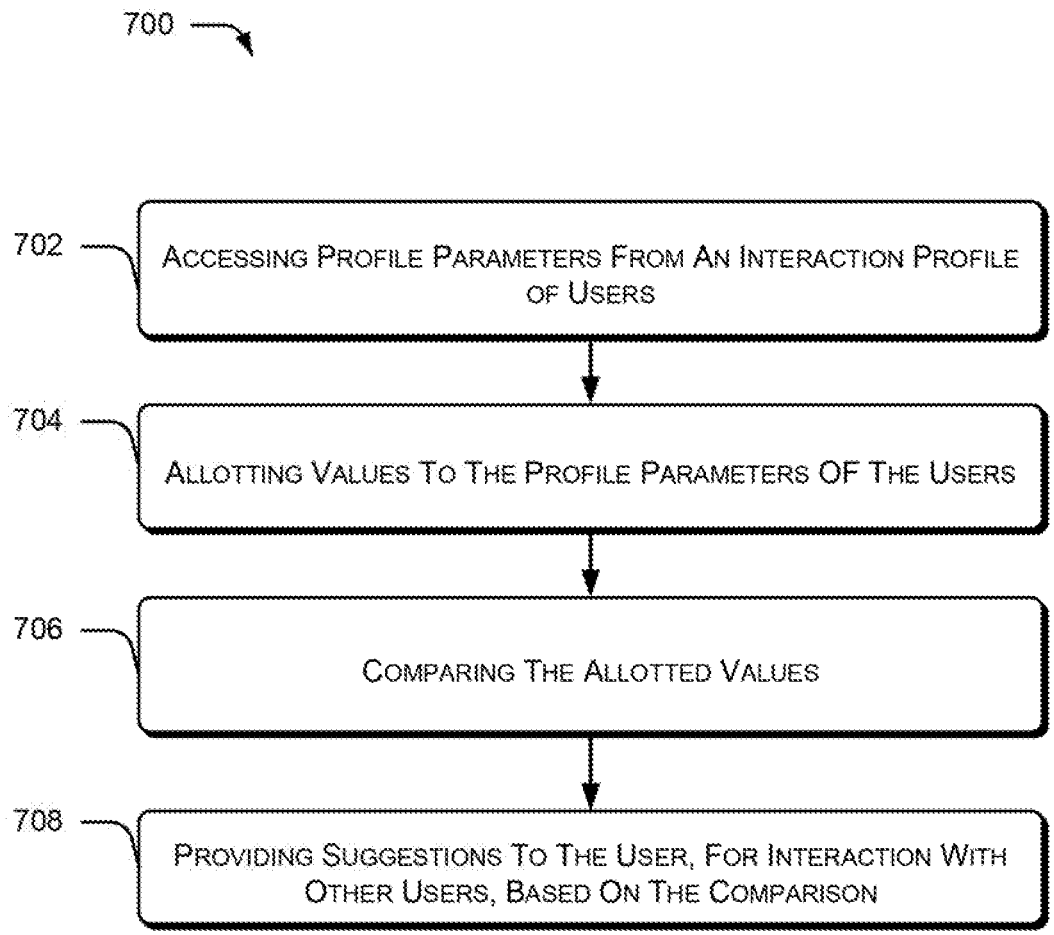
FIG. 7 illustrates yet another method 700 for providing suggestions for an interaction, according to an example of the present subject matter.

At block 614, suggestions are provided to the user and the at least one individual, based on the interaction profile of the user and the individual. In an example, the suggestion may provide recommendation for holding the event. For example, if the identified event is a date, a place, restaurant, resort, may be suggested, based on the profile parameter of the user and the woman, for attending the date. In another example, if the event is a business meeting, the suggesting place can be a hotel, auditorium, meeting halls etc. In another example, the suggestions may also be provided for a topic of discussion, type of food to be ordered etc. Finally, at block 618, the method terminates FIG. 7 illustrates a method 700 for providing suggestions for an interaction, in accordance with an example of the present subject matter. The method 700 may be implemented in a variety of interaction recommendation systems, but for the ease of explanation, the present description of the example method 700 to provide suggestions is provided in reference to the above-described interaction recommendation system 102.

The order in which the method 700 is described is not intended to be construed as a limitation, and any number of the described method blocks may be combined in any order to implement the method 7M), or an alternative method.

At block 702, profile parameters for users are accessed from the profile parameters of the users. In an example, the profile parameters may indicate choices, likes, preferences of users. The method then proceeds to block 704.

At block 704, values are allotted to the profile parameters of the users. The values are allotted to the profile parameters based on various factors, such as social media activity of the users, social interaction of the user.

At block 706, the allotted values are compared. As explained in para 32, the values of the plurality of profile parameters are compared. Finally, at block 708, the suggestions are provided to the user based on the comparison. For example, if it is determined that two users have same allotted value in a profile parameter, say, sports, the interaction recommendation system may recommend the both users to discuss topics related to sports.

Figure 8:
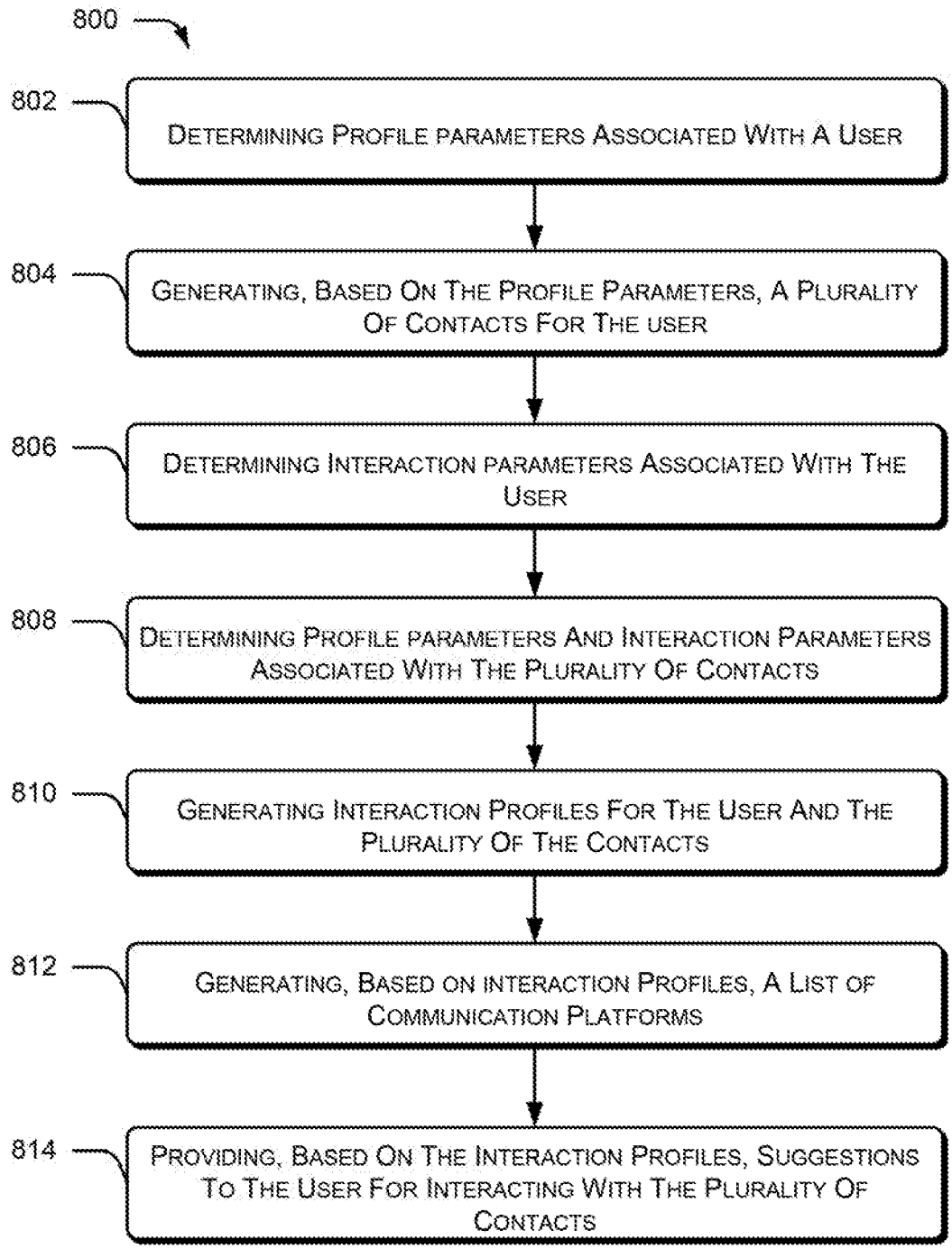
FIG. 8 illustrates yet another method 800 for providing suggestions for an interaction, in accordance with an example of the present subject matter.

FIG. 8 illustrates yet another method 800 for providing suggestions for an interaction, in accordance with an example of the present subject matter. The method 800 may be implemented in a variety of interaction recommendation systems, but for the ease of explanation, the present description of the example method 800 to provide suggestions is provided in reference to the above-described interaction recommendation system 102.

The order in which the method 800 is described is not intended to be construed as a limitation, and any number of the described method blocks may be combined in any order to implement the method 800, or an alternative method.

At block 802, profile parameters associated with a user are determined. The profile parameters may be determined by any of the techniques recited previously. The method thereafter proceeds to block 804 where a plurality of contacts is generated based on the profile parameters of the user. In an example, the profile parameters may comprise details, such as birthday of the user or any special occasion of the user. Further, it is natural for a person to talk to his family on his birthday. Thus, in the example, a plurality of contacts, from an address book of the user may selected and provided to the user wherein the plurality of the contacts may comprise the contacts of family members of the user.

At block 806, interaction parameters associated with the user is determined and the method proceeds to block 808 where profile parameters and interaction parameters associated with plurality of contacts is determined.

At block 810, interaction profiles for the user and the plurality of the contacts are generated and the method proceeds to block 812 where a list of communication platforms is generated based on interaction profiles. The list of the communication platforms may indicate applications which the user can for communication. For example, if it is indicated, based on the interaction profiles, that the user and the plurality of the contact uses skype, WhatsApp, emails frequently for communication, the list of communication platform may comprise skype, WhatsApp, and email platform as recommended means for communication. Finally, at block 814, suggestions may be provided to the user for the communication based on the interaction profiles. The suggestions may be about a topic of discussion, event, place of event etc. Thus, the methods and devices of the present subject matter provide techniques to provide suggestions for an interaction. Although examples of providing suggestions for an interaction as described, have been described in a language, specific to structural features and/or methods, it is to be understood that the appended claims are not necessarily limited to the specific features or methods described. Rather, the specific features and methods are disclosed as example for providing suggestions for an interaction.

The invention claimed is:

1. A method comprising:
Determining a plurality of profile parameters associated with a user, wherein the profile parameters are indicative of behavior, likes and dislikes of the user and wherein each of the profile parameters are generated using a language analysis algorithm to extract user information in IDs and categories, and wherein each of the profile parameters has values based on analysis of the user, wherein the values have a numerical value from a minimum value to a maximum value associated with the IDs and categories;

determining interaction parameters associated with the user, wherein the interaction parameters are indicative of interactional aspects of the user;

generating an interaction profile for the user based on the values of the determined profile parameters and the interaction parameters associated with the user; and providing suggestions to the user, for interaction with other users, based on the interaction profile of the user.

2. The method as claimed in claim 1, wherein the method further comprises:

identifying an event associated with the user;

providing suggestions to the user for the event.

3. The method as claimed in claim 2 further comprising:

identifying at least one other individual associated with the event;

generating an interaction profile for the at least one other individual based on profile parameters and interaction parameters associated with at least one other individual; and providing suggestions to the user for the event based on interaction profile of the user and the interaction profile of the at least one other individual.

4. The method as claimed in claim 1, wherein the profile parameters comprises at least one of personality type, favorite genre of movies, type of music, hobbies, favorite places, favorite cuisine, phycology, sociology, and environmental condition, political favorites, sports favorites.

5. The method as claimed in claim 1, wherein the interaction parameters comprises at least past interaction experiences.

6. The method as claimed in claim 1, wherein the providing suggestions comprises at least one of location for an event, topics of discussion during the event, attire for the event and special requirement for the event.

7. The method as claimed in claim 1, wherein the suggestions to the user is provided based on a group of the user and the other individuals, and wherein the group is based on at least one of age, sex, professional goal, business goal, objective of life.

8. The method as claimed in claim 1, wherein the suggestions are provided based on historical interactions of the user and the other individuals.

9. An interaction recommendation system comprising:

at least one backend server including a processor and database, the backend server including a parameter module configured to:

determine a plurality of profile parameters associated with a user, wherein the profile parameters are indicative of behavior, likes and dislikes of the user, and wherein each of the profile parameters are generated using a language analysis algorithm to extract user information in IDs and categories, and wherein each of the profile parameters has values based on analysis of the user, wherein the values have a numerical value from a minimum value to a maximum value associated with the IDs and categories;

determine interaction parameters associated with the user, wherein the interaction parameters are indicative of interactional aspects of the user;

the backend server further including a recommendation module configured to:

generate an interaction profile for the user based on the values of the determined profile parameters and the interaction parameters associated with the user; and provide suggestions to the user, for interaction with other individuals, based on the interaction profile of the user.

10. The interaction recommendation system as claimed in claim 9, wherein the providing suggestions comprises at least one of location for the event, topics of discussion during an event, attire for the event and special requirement for the event.

11. The interaction recommendation system as claimed in claim 9, wherein the suggestions to the user is provided based on a group of the user and the other individuals, and wherein the group is based on at least one of age, sex, professional goal, business goal, objective of life.

12. The interaction recommendation system as claimed in claim 9, wherein the recommendation module is to:

identifying an event associated with the user; and providing suggestions to the user for the event.

13. The interaction recommendation system as claimed in claim 12 further comprising:

identifying at least another individual associated with the event;

generating an interaction profile for the another individual based on profile parameters and interaction parameters associated with the another individual; and providing suggestions to the user for the event based on interaction profile of the user and the interaction profile of the another individual.

14. The interaction recommendation system as claimed in claim 9, wherein the recommendation module is to provide suggestion based on historical interactions of the user and the other individuals.

15. The interaction recommendation system as claimed in claim 14, wherein the historical interactions include a social media post, a social media status, last attended event, frequency of contact with other individuals.

* * * * *